United States Patent [19]

Syrop et al.

[11] Patent Number: 4,772,493

[45] Date of Patent: Sep. 20, 1988

[54] PROCESS FOR IMPREGNATING

[75] Inventors: Alan N. Syrop; Richard W. Eve; Stephen Temple, all of Cambridge, England

[73] Assignee: Perstorp AB, Perstorp, Sweden

[21] Appl. No.: 126,113

[22] Filed: Nov. 27, 1987

[30] Foreign Application Priority Data

Nov. 27, 1986 [SE] Sweden .............................. 8605082

[51] Int. Cl.$^4$ .......................... B05D 1/18; B05D 3/02; B05D 3/12
[52] U.S. Cl. ................................ 427/370; 427/385.5; 427/386; 427/389.8; 427/389.9; 427/391; 427/434.5; 427/439
[58] Field of Search ...................... 427/335, 385.5, 386, 427/389.8, 389.9, 391, 434.5, 439, 370

[56] References Cited

U.S. PATENT DOCUMENTS

| | | | |
|---|---|---|---|
| 2,050,483 | 8/1936 | Brown | 427/434.5 X |
| 3,022,802 | 2/1962 | Lewis | 427/434.5 X |
| 4,438,159 | 3/1984 | Weber | 427/335 X |

Primary Examiner—Michael R. Lusignan
Attorney, Agent, or Firm—Stevens, Davis, Miller & Mosher

[57] ABSTRACT

A process for impregnating a continuous sheet of glass fibre web, paper, carbon fibre, cloth etc., which comprises feeding the sheet continuously into a closed vessel filled to a suitable height with a polymer solution, immersing the sheet under the surface of polymer solution while causing solvent boiling to occur and solvent vapor bubbles to flow out of the sheet, whereby bubbles of gas, such as air held or absorbed in the sheet during the immersion, are automatically removed from the sheet and then withdrawing the sheet from the vessel.

12 Claims, No Drawings

PROCESS FOR IMPREGNATING

The present invention relates to a process for impregnating a continuous sheet of glass fibre web, paper, carbon fibre, cloth etc.

It has been known for a very long time to continuously impregnate for instance glass fibre web with epoxy resin and paper sheets with different resins such as phenol-formaldehyde resin, melamine-formaldehyde resins etc.

Then usually the glass fibre sheet or the paper sheet respectively is allowed to pass through an open resin bath of an impregnating device and then through squeeze rolls or scrapers for application of the correct amount of resin on the sheet.

The sheet is then passing through an oven for evaporation of solvent and curing of the resin to so-called B-stage. Finally, the impregnated material, the so-called prepreg, is cut or rolled for subsequent processing and final curing in a press to laminates of different kinds.

The above disclosed previously known impregnation technique is connected with certain disadvantages. Thus, it is necessary to use rather low viscous resins and long dwell times in the resin bath to get as good impregnation as possible. Accordingly, the impregnation goes slowly. Moreover, the low viscous resins have a high content of solvent. This solvent must be evaporated in the above mentioned oven, which results in environmental problems. The production capacity of the impegnation device is also low. In addition, the process gives an unsatisfactory product with air embedded in the sheet. This causes serious quality disturbances of the final product, the laminate.

According to the present invention it has been possible to avoid the above disadvantages and bring about a process for impregnating a continuous sheet of glass fibre web, paper, carbon fibre, cloth etc. The process comprises feeding the sheet continuously into a closed vessel filled to a suitable height with a polymer solution, immersing the sheet under the surface of polymer solution while causing solvent boiling to occur and solvent vapour bubbles to flow out of the sheet, whereby bubbles of gas such as air held or adsorbed in the sheet during the immersion are automatically removed from the sheet and then withdrawing the sheet from the vessel.

Usually, the gas bubbles are removed from the sheet by convection.

The pressure in the vessel can be atmospheric pressure or higher. However, generally it is preferable to have a lower pressure than atmospheric pressure. Whatever pressure used, it should be adapted to the temperature to cause boiling of the solvent of the polymer.

Usually, the pressure is about 0–900 m bar and the temperature 10°–250° C. in the vessel. Very often the pressure is 20–500 m bar, such as 20–300 m bar and the temperature 15°–150° C.

A low temperature is favourable from the view point of energy consumption and resin stability. Therefore, it is especially advantageous to have a temperature of 15°–100° C. such as 15°–35° C. and a pressure of 20–300 m bar.

It is preferable to furnish the impregnation vessel in such a way that the pressure and the temperature can easily be adjustable. Thus, if a lower pressure than atmospheric pressure is used the vessel should be connected with a vacuum pump. The vessel can also be provided with heating or cooling means etc.

Usually, it is too expensive and complicated to make an impregnation vessel on an industrial scale which can stand a pressure lower than about 20 m bar. According to the present invention there is no need for a lower pressure than 20 m bar either even if the invention works also at a pressure down to about 0 m bar.

In those cases where the polymer consists of a thermosetting resin the polymer solution usually contains a curing agent. The solution can also contain an accelerator which speeds up the curing.

The polymer can for example consist of epoxy resin, melamine-formaldehyde resin, phenol-formaldehyde resin, urea-formaldehyde resin, urea-melamine-formaldehyde resin or a similar resin.

It is also possible that the polymer is a thermoplast.

The solvent is usually acetone, methanol, dimethyl formamide, propylene glycol monomethyl ether, ethylene glycol monomethyl ether, xylene or methyl ethyl ketone or a mixture containing at least one of said solvents.

Before entering the vessel with polymer solution the continuous sheet usually has a temperature of 10°–45° C., preferably 15°–25° C. This means that no heating or cooling of the sheet is necessary at the ordinary process.

The pressure surrounding the sheet before the latter enters the vessel is usually atmospheric pressure. This means that no special arrangements have to be made to regulate the pressure at said stage.

One embodiment according to the invention relates to a process for impregnating a continuous sheet of glass fibre or paper, which comprises passing the sheet continuously through a room with atmospheric pressure and a temperature of about 10°–45° C., feeding the sheet into a closed vessel filled to a suitable height with a solution of epoxy resin or phenol-formaldehyde resin, immersing the sheet under the surface of said polymer solution while causing solvent boiling to occur and solvent vapour bubbles to flow out of the sheet by arranging a temperature of about 15°–150° C., preferably 15°–100° C. and a pressure of about 0–900 m bar, preferably about 20–300 m bar in the vessel, whereby bubbles of gas, such as air held or adsorbed in the sheet during the immersion, are automatically removed from the sheet and then withdrawing the sheet from the vessel.

The invention will be explained further in connection with the embodiment examples below, of which Example 1 relates to impregnation of glass web with epoxy resin and Examples 2 and 3 relate to impregnation of paper with phenol-formaldehyde resin.

EXAMPLE 1

A sheet of a glass web roll with a surface weight of 200 g/m$^2$ was continuously fed with a velocity of 20 m/min into a vessel with adjustable pressure. The vessel was filled to a suitable height with a polymer solution containing epoxy resin, solvent, curing agent and accelerator. The solvent consisted of a mixture of aceton, ethylene glycol monomethyl ether and dimethyl formamide, where the respective solvent made 15, 15 and 6 percent by weight respectively calculated on the whole polymer solution. The resin content of the polymer solution was 64 percent by weight calculated on dry resin. The curing agent consisted of dicyandiamide at a content of 3.2 percent by weight calculated on dry epoxy resin and the accelerator of benzyldimethyl amine at a content of 0.2 percent by weight calculated in the same way.

The sheet was immersed under the surface of the polymer solution in the vessel. The temperature in the vessel was 20° C. and the pressure 180 m bar. This combination of pressure and temperature made the solvent boil. The vessel was continuously evacuated to keep a constant pressure of 180 m bar. This evacuation and the boiling of the solvent resulted in that air bubbles embedded in the sheet were also evacuated.

The impregnated glass web sheet was therefore free from air inclusions. After the vessel the impregnated sheet passed between squeeze rolls for adjustment of the resin content to correct value.

After drying and curing in a conventional way in an oven a prepreg cured to so-called B-stage was obtained. This prepreg had a high quality and no air inclusions.

EXAMPLE 2

The process according to Example 1 was repeated with the difference that the polymer solution consisted of an unmodified phenol-formaldehyde resin with methanol as a solvent. The methanol made 25.0 percent by weight calculated on the whole polymer solution. The resin content of the polymer solution calculated as dry resin was 35 percent by weight.

Moreover, a sheet of paper with a surface weight of 150 g/m$^2$ was used instead of glass web.

Finally, the pressure was 100 m bar and the temperature 25° C. in the vessel.

The impegnated paper sheet as well as the prepreg obtained after drying and curing to B-stage were free from air inclusions.

EXAMPLE 3

The process according to Example 2 was repeated with the difference that a modified phenol-formaldehyde resin was used with a mixture of methanol and xylene as a solvent. The methanol made 15 percent by weight and the xylene 3 percent by weight calculated on the whole polymer solution.

The resin content of the polymer solution calculated as dry resin was 55 percent by weight. In this test the paper sheet had a surface weight of 125 g/m$^2$.

The impregnated paper sheet as well as the prepreg obtained after drying and curing to B-stage were free from air inclusions.

The invention is not limited to the embodiments shown, since these can be modified in different ways within the scope of the present invention.

We claim:

1. A process for impregnating a continuous sheet of glass fibre web, paper, carbon fibre, cloth, which comprises feeding the sheet continuously into a closed vessel filled to a suitable height with a polymer solution, immersing the sheet under the surface of polymer solution while causing solvent boiling to occur and solvent vapour bubbles to flow out of the sheet, whereby bubbles of gas, such as air held or adsorbed in the sheet during the immersion, are automatically removed from the sheet and then withdrawing the sheet from the vessel.

2. A process according to claim 1, wherein the gas bubbles are removed from the sheet by convection.

3. A process according to claim 1, wherein the pressure in the vessel is lower than atmospheric pressure and adapted to the temperature to cause boiling of the solvent of the polymer.

4. A process according to claim 1, wherein the temperature in the vessel is about 10°–250° C. and the pressure about 0–900 m bar.

5. A process according to claim 1, wherein the temperature is about 15°–150° C. and the pressure about 20–300 m bar.

6. A process according to claim 1, wherein the temperature is about 15°–100° C. and the pressure is about 20–300 m bar.

7. A process according to claim 1, wherein the polymer solution also contains a curing agent and/or an accelerator for the polymer.

8. A process according to claim 1, wherein the polymer consists of epoxy resin, melamine-formaldehyde resin, phenol-formaldehyde resin, urea-melamine-formaldehyde resin, urea-formaldehyde resin or a similar resin.

9. A process according to claim 1, wherein the solvent consists of acetone, methanol, dimethyl formamide, propylene glycol monomethyl ether, ethylene glycol monomethyl ether, xylene or methyl ethyl ketone or a mixture containing at least one of said solvents.

10. A process according to claim 1, wherein the sheet has a temperature of about 10°–45° C., preferably about 15°–25° C. before entering the vessel with polymer solution.

11. A process according to claim 1, wherein the pressure surrounding the sheet before the latter enters the vessel is atmospheric pressure.

12. A process for impregnating a continuous sheet of glass fibre or paper, which comprises passing the sheet continuously through a room with atmospheric pressure and a temperature of about 10°–45° C., feeding the sheet into a closed vessel filled to a suitable height with a solution of epoxy resin or phenol-formaldehyde resin, immersing the sheet under the surface of said polymer solution while causing solvent boiling to occur and solvent vapour bubbles to flow out of the sheet by arranging a temperature of about 15°–150° C., preferably 15°–100° C. and a pressure of about 0–900 m bar, preferably about 20–300 m bar in the vessel, whereby bubbles of gas, such as air held or adsorbed in the sheet during the immersion, are automatically removed from the sheet and then withdrawing the sheet from the vessel.

* * * * *